(12) United States Patent
Popa et al.

(10) Patent No.: US 8,054,834 B2
(45) Date of Patent: Nov. 8, 2011

(54) METHOD AND EQUIPMENT FOR DEMULTIPLEXING VARIABLE SIZE PROTOCOL DATA UNITS

(75) Inventors: Daniel Popa, Paris (FR); Arnaud Dupas, Breuillet (FR)

(73) Assignee: Alcatel Lucent, Paris (FR)

( * ) Notice: Subject to any disclaimer, the term of this patent is extended or adjusted under 35 U.S.C. 154(b) by 209 days.

(21) Appl. No.: 12/457,411

(22) Filed: Jun. 10, 2009

(65) Prior Publication Data

US 2010/0034203 A1 Feb. 11, 2010

(30) Foreign Application Priority Data

Jun. 23, 2008 (EP) .................................. 08290594

(51) Int. Cl.
*H04L 12/56* (2006.01)
*H04J 3/24* (2006.01)
(52) U.S. Cl. ...................................... 370/392; 370/474
(58) Field of Classification Search ................... None
See application file for complete search history.

(56) References Cited

U.S. PATENT DOCUMENTS

| | | | |
|---|---|---|---|
| 5,509,007 A | 4/1996 | Takashima et al. | |
| 6,618,368 B1 | 9/2003 | Tanigawa et al. | |
| 7,266,087 B2 * | 9/2007 | Wahl | 370/252 |
| 7,545,807 B2 * | 6/2009 | Hwang et al. | 370/389 |
| 7,738,369 B2 * | 6/2010 | Carmon et al. | 370/230 |
| 2003/0193950 A1 | 10/2003 | Philips et al. | |
| 2004/0114623 A1 | 6/2004 | Smith | |
| 2006/0034331 A1 * | 2/2006 | Rinne et al. | 370/469 |
| 2006/0092911 A1 | 5/2006 | Hwang et al. | |
| 2006/0171406 A1 * | 8/2006 | Kwon et al. | 370/419 |
| 2007/0021932 A1 | 1/2007 | Chen et al. | |
| 2007/0086367 A1 * | 4/2007 | Sung et al. | 370/278 |
| 2007/0201390 A1 * | 8/2007 | Kim et al. | 370/310.2 |
| 2007/0229214 A1 * | 10/2007 | Meirick et al. | 340/2.23 |
| 2007/0297451 A1 * | 12/2007 | Kim et al. | 370/469 |
| 2010/0189007 A1 * | 7/2010 | Chun et al. | 370/252 |

FOREIGN PATENT DOCUMENTS

| | | |
|---|---|---|
| WO | WO 03/103242 | 12/2003 |
| WO | WO 2005/055472 | 6/2005 |
| WO | WO 2007/090834 | 8/2007 |

* cited by examiner

*Primary Examiner* — Hong Cho
(74) *Attorney, Agent, or Firm* — Harness, Dickey & Pierce, P.L.C.

(57) ABSTRACT

The present invention relates to a method for demultiplexing MAC service data units encapsulated into MAC protocol data units, said MAC service data units comprising IP protocol data unit wherein said method comprises the following steps:
  receiving MAC protocol data units,
  demultiplexing the received MAC service data units by:
    detecting the beginning of a MAC service data unit by detecting a MAC layer service primitive,
    recursively demultiplexing said at least one IP protocol data unit contained in said MAC service data unit,
    detecting the end of said MAC service data unit by detecting MAC layer service primitives.

9 Claims, 4 Drawing Sheets

METHOD AND EQUIPMENT FOR DEMULTIPLEXING VARIABLE SIZE PROTOCOL DATA UNITS

BACKGROUND OF THE INVENTION

The present invention relates to the field of variable size packet demultiplexing and more specifically of concatenated and encapsulated packet demultiplexing.

To achieve reliable data transmission in communication networks, data needs to be encapsulated in data packets. FIG. 1 represents these encapsulations at the different OSI layers (link/MAC) and physical layers (PHY). The data payload represented by the IP protocol data unit (IP-PDU) 1 comprises data coming from the IP layer. Said data is first encapsulated at the MAC layer by adding a MAC header 3 and a MAC trailer 5. Then, the MAC protocol data unit (MAC-PDU) 2, comprising parts 1, 3 and 5, is encapsulated at the physical layer with a physical header 7 and a physical trailer 9. This organization in different sections allows to perform transmission and efficient decapsulation and demultiplexing at destination. FIG. 2 represents the organization of this encapsulation at the MAC layer according to the IEEE 802.3 standard.

Three main parts can be defined
  a front part called MAC header 3 comprising destination section 11 and source section 13 addresses as well as information section 15 concerning the data carried in the MAC service data unit (MAC-SDU) 1 such as the type of data and the size of the MAC-SDU 1,
  the MAC service data unit (MAC-SDU) 1 corresponding to the IP-PDU and therefore to the data to be transmitted,
  a MAC trailer 5 indicating the end of the MAC-SDU 1.

In order to improve the efficiency of communication networks, protocol data unit concatenation methods have been developed. These techniques consist in gathering several PDU sections having a common destination in one service data unit. Thus, the required number of headers and trailers is reduced and the performance of the network is optimized. FIG. 3 shows such concatenation of the IP-PDUs 17. The different IP-PDUs are put together in a MAC-SDU 1, encapsulated in a MAC-PDU 2 and sent as a common data unit to their destination. In such cases, demultiplexing of the concatenated IP-PDUs require to determine the beginning and the end of the MAC-SDU 1 comprising said IP-PDUs 17. In the state of the art, this determination is achieved by decoding in the MAC header information concerning the length of the MAC-SDU 1. Such decoding increases the demultiplexing processing load and may therefore reduce the overall throughput of the data transmission.

SUMMARY OF THE INVENTION

It is therefore an object of the present invention to overcome the precited drawbacks of the state of the art and provide a method for demultiplexing MAC service data units encapsulated into MAC protocol data units, said MAC service data units comprising at least one IP protocol data unit wherein said method comprises the following steps:
  receiving MAC protocol data units,
  demultiplexing the received MAC service data units by:
    detecting the beginning of a MAC service data unit by detecting a MAC layer service primitive,
    recursively demultiplexing said at least one IP protocol data unit contained in said MAC service data unit,
    detecting the end of said MAC service data unit by detecting a MAC layer service primitive.

According to one aspect of the present invention, said MAC layer service primitives used to determine the beginning and the end of the MAC service data units are signals locally exchanged between the different processing units of line-cards or switching equipment.

According to another aspect of the present invention, the size of said MAC service data units is variable.

According to a further aspect of the present invention, the step of demultiplexing said at least one IP protocol data unit located in said MAC service data units is achieved by decoding information located in the IP header.

Furthermore, equipment for demultiplexing MAC service data units encapsulated into MAC protocol data units comprising at least one processing mean being adapted to perform the following steps:
  receiving MAC protocol data units,
  demultiplexing the received MAC service data units by:
    detecting the beginning of a MAC service data unit by detecting a MAC layer service primitive,
    recursively demultiplexing said IP protocol data units contained in said MAC service data unit,
    detecting the end of said MAC service data unit by detecting MAC layer service primitives.

According to one aspect of the present invention, said equipment comprises at least one processing mean being adapted to perform the following additional step:
  transmitting demultiplexed IP protocol data units to their destination queue.

According to another aspect of the present invention, said MAC layer service primitives are signals locally exchanged between the different processing units of line-cards or switching equipment.

According to another aspect of the present invention, the size of said MAC service data units is variable.

According to a further aspect of the present invention, it comprises at least one processing mean being adapted to perform the determination of the length of an IP protocol data unit during its demultiplexing.

DETAILED DESCRIPTION OF THE INVENTION

As used herein, the term "egress node" refers to the destination node where the concatenated packets are demultiplexed in order for the data to be processed.

As used herein, the term "MAC" refers to the acronym Media Access Control.

As used herein, the term "IP" refers to the acronym Internet Protocol.

As used herein, the term "OSI" refers to the acronym Open Systems Interconnect.

As used herein, the term "service data unit (SDU)" refers to the payload of a particular OSI layer.

As used herein, the term "protocol data unit (PDU)" refers to a frame of a particular OSI layer comprising a service data unit of said OSI layer encapsulated in a header and a trailer of said OSI layer. Thus, the service data unit of a MAC layer corresponds to the protocol data unit of an IP layer.

As used herein the term "line card" refers to a modular electronic circuit on a printed circuit board, the electronic circuits on the card interfacing the telecommunication lines coming from the subscribers (such as copper wire or optical fibers) to the rest of the telecommunication access network.

In the following description, reference numbers below 100 refer to devices, apparatus, equipments or parts of them whereas reference numbers above 100 refer to the steps of a method.

The present invention offers to ease the demultiplexing of MAC service data units 1 by providing an efficient way to determine the beginning and the end of said MAC-SDUs 1. A communication network comprises a plurality of nodes linked to each other. Thus, at each node, requests for transmitting data to an egress node need to be processed as fast as possible while insuring data integrity at destination. Data having the same egress node are gathered to reduce the overall amount of data transmitted and to decrease the required bandwidth for transmission. Aggregation of the IP-PDUs 17 is achieved by concatenation during encapsulation at the MAC layer.

One can notice the variable size of the IP-PDUs 17. Indeed, the use of padding would allow to have IP-PDUs 17 of equal size which would simplify the demultiplexing but in return this would reduce the amount of useful transmitted data and would reduce the overall throughput.

Moreover, the number of concatenated IP-PDUs 17 into a MAC-SDU 1 may vary too so that the size of a MAC-SDU 1 is variable.

Figure 1:
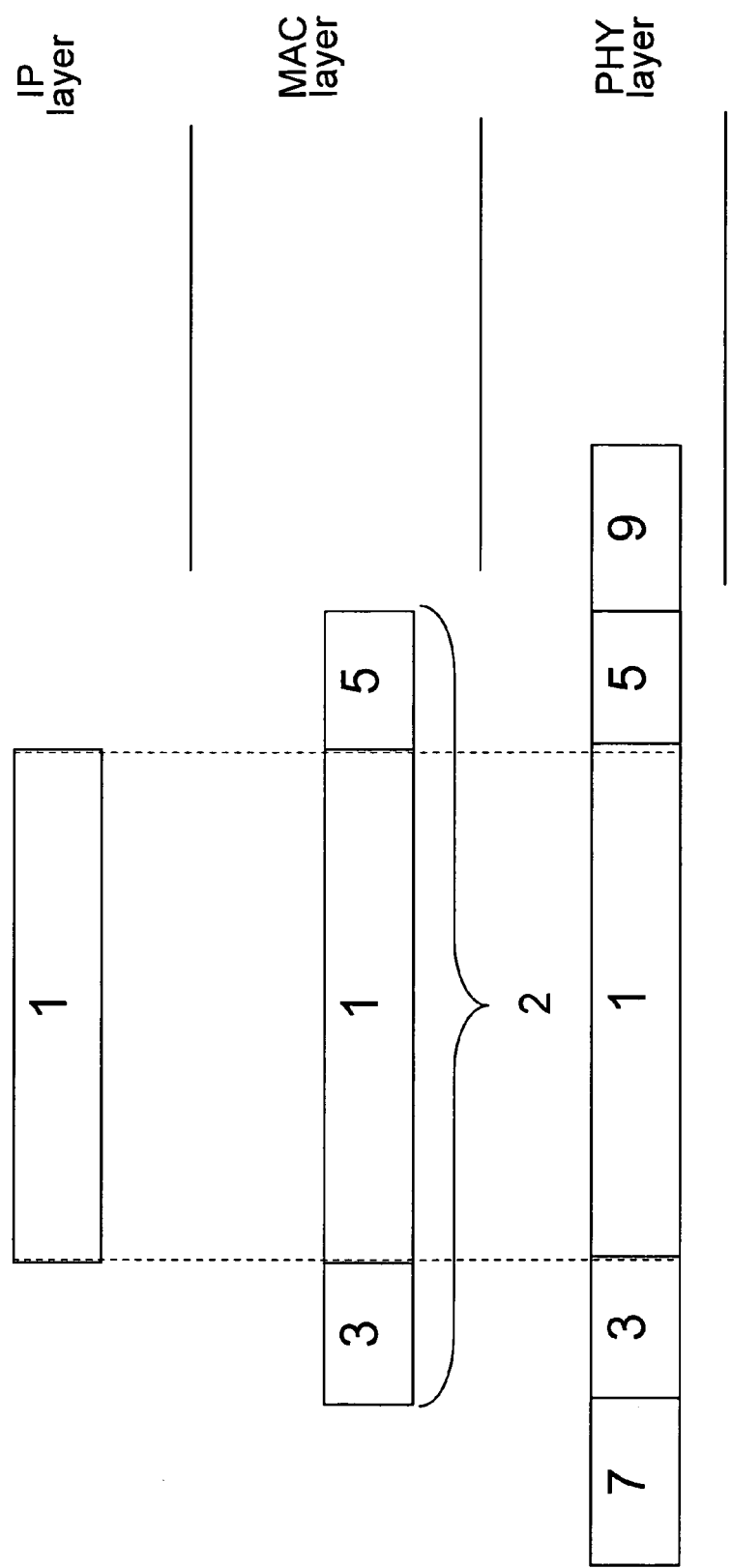
FIG. 1 is a diagram of the different consecutive packet encapsulations corresponding to the different layers.
Figure 2:
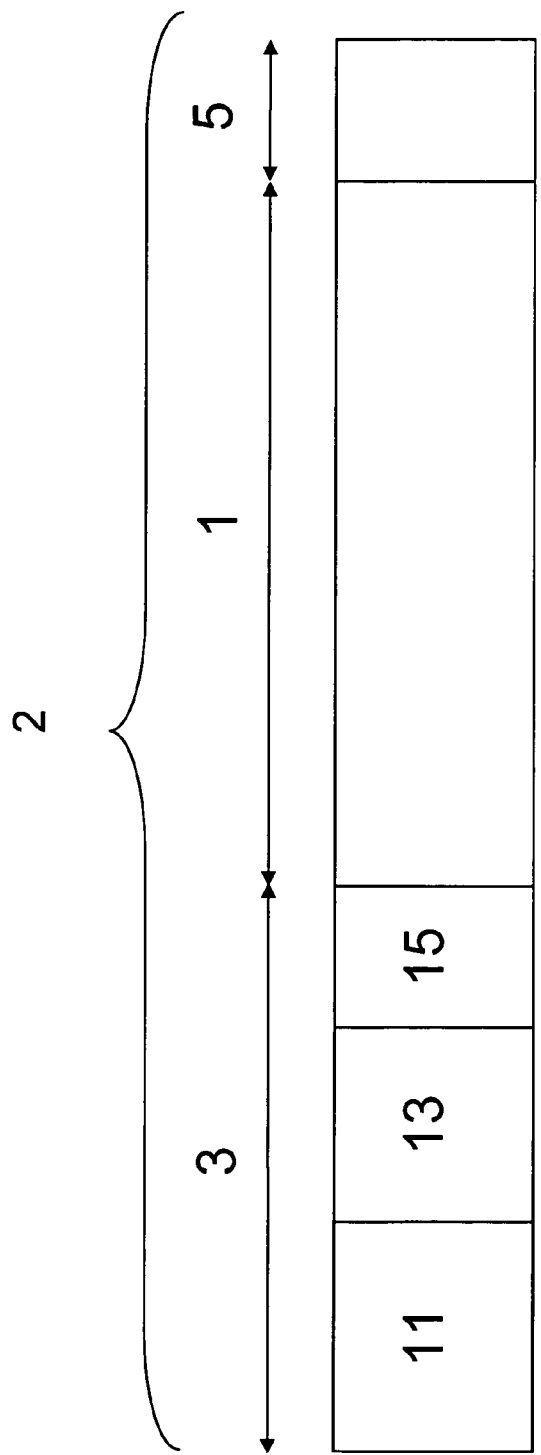
FIG. 2 is a diagram representing a detailed encapsulation at the MAC layer.
Figure 3:
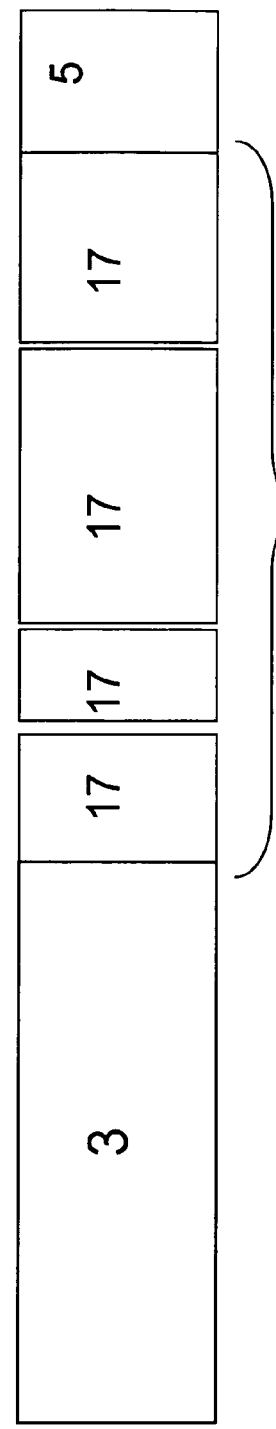
FIG. 3 is a diagram representing the concatenation of IP protocol data units.
Figure 4:
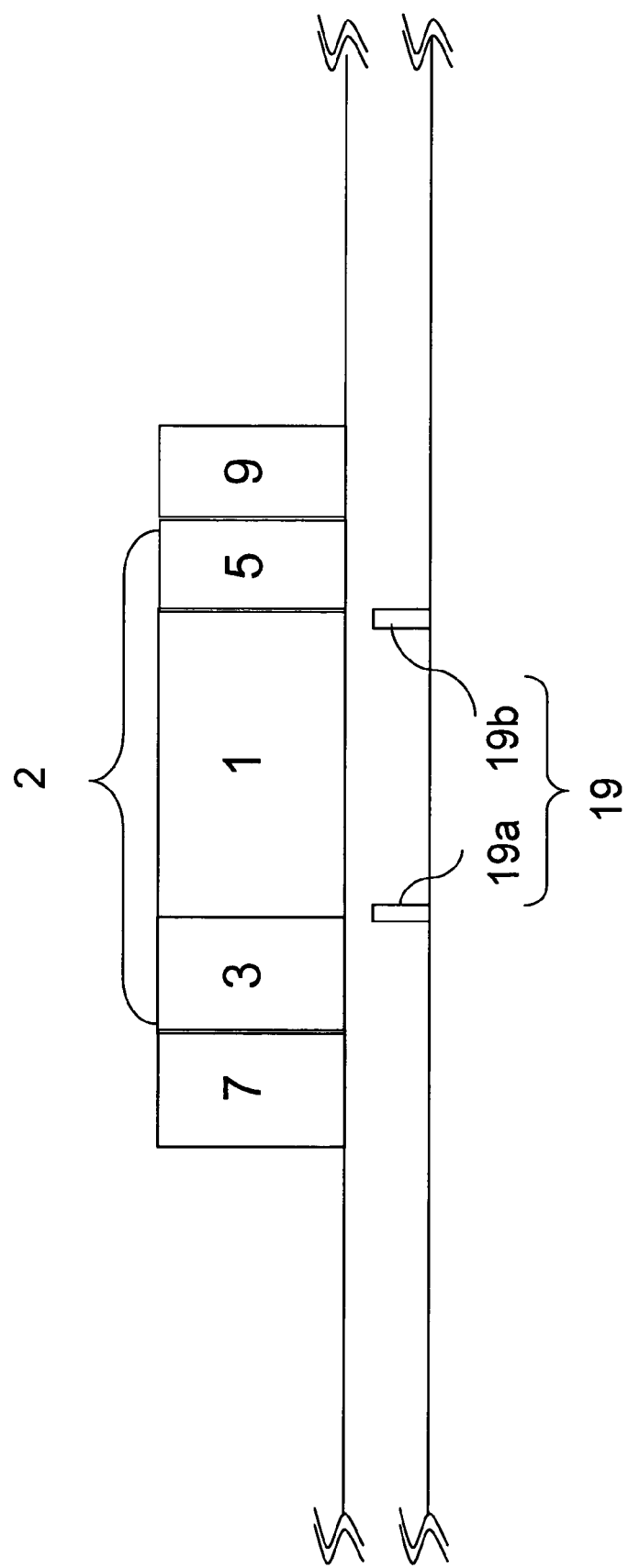
FIG. 4 is a diagram representing the MAC service data units and the MAC layer service primitives corresponding to the beginning and the end of the MAC service data unit.

According to an aspect of the present invention, it is proposed to use a recursive method in order to avoid the need for decoding information concerning the length of the MAC-SDU 1 from the MAC header 3. Moreover, the idea is to use signals corresponding to the beginning and the end of the MAC-SDU 1. Such signals are described in FIG. 4. As represented, these signals 19, also called service primitives, occur at the boundaries of each MAC-SDU 1 and correspond to signals locally exchanged into line-cards or switching equipment. Thus, these service primitives 19 can be used to ease the demultiplexing of the MAC-SDU 1 by detecting its beginning and end without requiring the decoding of the MAC headers 3 of the MAC-PDU 2. Thus, by avoiding full decoding of the MAC header 3, the present invention reduces the processing load of the demultiplexing and therefore increases network performances.

Figure 5:
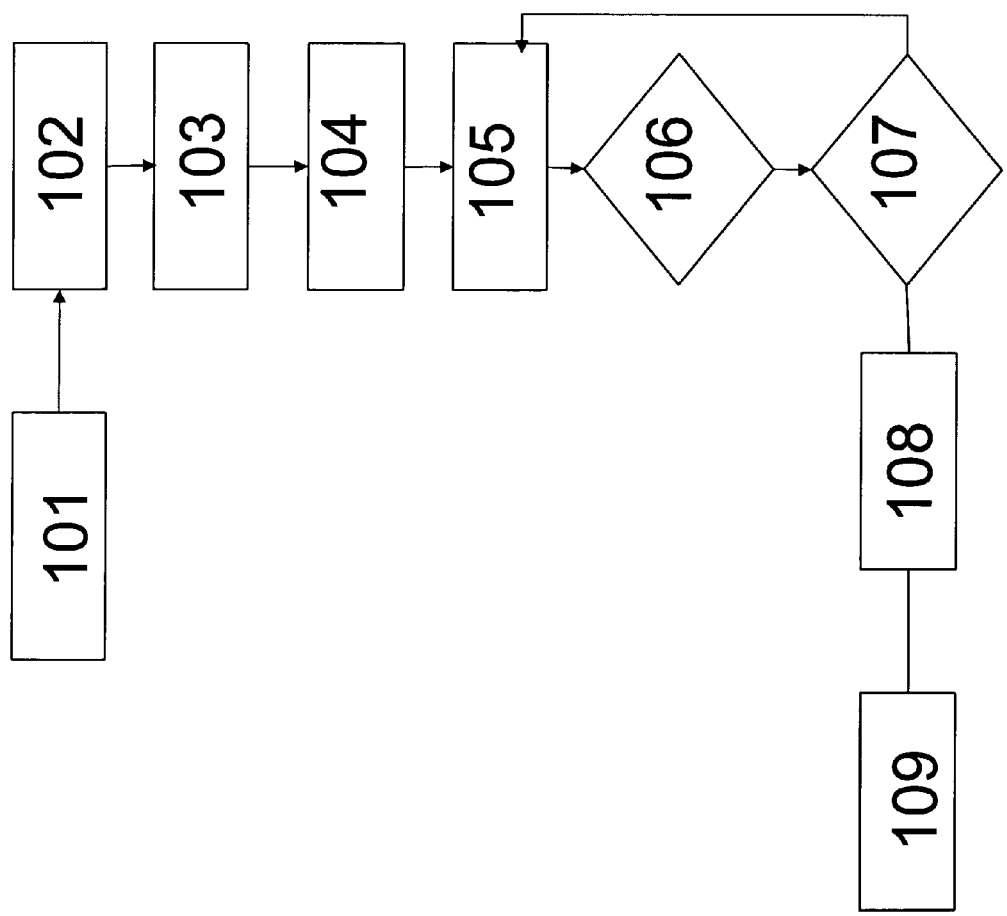
FIG. 5 is synoptic representation of the different step of the demultiplexing method according to the present invention.

Considering this possibility, the different steps of the offered method are presented in FIG. 5. The first step (101) is the reception of MAC-PDUs 2 at the egress node where demultiplexing is required. The MAC header 3 is partially decoded in order to know the destination of the MAC-SDU 1 (step 102). As the MAC header 3 is organized according to the Ethernet protocol, the size of the MAC header 3 is always the same and the position of the information corresponding to the destination is known. Thus, only the MAC header portion comprising the destination is decoded. The MAC-SDU 1 is then transmitted to the IP layer. At the same time, a MAC layer service primitive 19*a* is transmitted to the IP layer (step 103). When a MAC layer service primitive 19*a* corresponding to the beginning of the MAC-SDU 1 is detected (step 104), demultiplexing (step 105), determination of their length (step 106) and transmission to their destination queue (step 107) of the IP-PDUs 17 is achieved recursively until the detection (step 108) of a service primitive 19*b* corresponding to the end of the MAC-SDU 1. Said service primitive 19*b* is also transmitted from the MAC layer. It has to be noted that the determination of the length of the IP-PDUs 17 and of their destination is achieved by a decoding of the IP header. After demultiplexing of the first IP-PDU 17, the demultiplexing equipment checks for the presence of another IP-PDU 17. If an IP-PDU 17 to be demultiplexed is present, this IP-PDU 17 becomes the first IP-PDU 17 and the recursive method goes back to step 105. After demultiplexing of all the concatenated IP-PDU 17 which corresponds to the detection of a MAC layer service primitive 19*b* corresponding to the end of the MAC-SDU 1 (step 108), the method goes to step 109 which is the end of the demultiplexing method.

Thus, according to the present invention, the use of service primitives 19 to determine the MAC-SDU 1 boundaries in a recursive method allows to improve the efficiency of the IP-PDU 17 demultiplexing. The demultiplexing is faster and requires less network resources leading therefore to an increased overall throughput of the network.

The invention claimed is:

1. Method for demultiplexing MAC service data units encapsulated into MAC protocol data units, said MAC service data units comprising at least one IP protocol data unit wherein said method comprises:
   receiving MAC protocol data units,
   demultiplexing the received MAC service data units by:
      detecting the beginning of a MAC service data unit by detecting a MAC layer service primitive,
      recursively demultiplexing said at least one IP protocol data unit contained in said MAC service data unit, without decoding MAC service data unit header information related to a length of the MAC service data units,
      detecting the end of said MAC service data unit by detecting a MAC layer service primitive.

2. Method for demultiplexing MAC service data units encapsulated into MAC protocol data units in accordance with claim 1 wherein said MAC layer service primitives used to determine the beginning and the end of the MAC service data units are signals locally exchanged between the different processing units of line-cards or switching equipment.

3. Method for demultiplexing MAC service data units encapsulated into MAC protocol data units in accordance with claim 1 wherein the size of said MAC service data units is variable.

4. Method for demultiplexing MAC service data units encapsulated into MAC protocol data units in accordance with claim 1 wherein the step of demultiplexing said at least one IP protocol data unit located in said MAC service data units is achieved by decoding information located in the IP header.

5. Equipment for demultiplexing MAC service data units encapsulated into MAC protocol data units comprising:
   at least processor of an egress node being configured to perform:
   receiving (101) MAC protocol data units,
   demultiplexing the received MAC service data units by:
      detecting the beginning of a MAC service data unit by detecting a MAC layer service primitive,
      recursively demultiplexing said IP protocol data units contained in said MAC service data unit, without decoding MAC service data unit header information related to a length of the MAC service data units,
      detecting the end of said MAC service data unit by detecting MAC layer service primitives.

6. Equipment for demultiplexing MAC service data units encapsulated into MAC protocol data units in accordance with claim 5 comprising at least one processing mean being configured to perform the following additional step:

transmitting demultiplexed IP protocol data units to their destination queue.

7. Equipment for demultiplexing MAC service data units encapsulated into MAC protocol data units in accordance with claim 5 wherein said MAC layer service primitives are signals locally exchanged between the different processing units of line-cards or switching equipment.

8. Equipment for demultiplexing MAC service data units encapsulated into MAC protocol data units in accordance with claim 5 wherein the size of said MAC service data units is variable.

9. Equipment for demultiplexing MAC service data units encapsulated into MAC protocol data units in accordance with claim 5 wherein it comprises at least one processing mean being configured to perform the determination of the length of an IP protocol data unit during its demultiplexing.

* * * * *